United States Patent

Hand

[15] 3,644,004
[45] Feb. 22, 1972

[54] MEANS TO PREVENT LUBRICANT FROM BEING FORCED OUT OF BEARINGS AND THE LIKE

[72] Inventor: Alton E. Hand, Birmingham, Ala.
[73] Assignee: Zurn Industries, Inc.
[22] Filed: Aug. 18, 1970
[21] Appl. No.: 64,785

[52] U.S. Cl. ........................................................308/36.3
[51] Int. Cl. .............................................................F16c 33/72
[58] Field of Search .................308/36.4, 36.3; 277/133, 134

[56] References Cited

UNITED STATES PATENTS

| 1,957,054 | 5/1934 | Waldorf | 308/36.3 |
| 3,447,847 | 6/1969 | Stansell et al. | 377/133 |

FOREIGN PATENTS OR APPLICATIONS 585,915 12/1924 France....................................277/133

Primary Examiner—Edgar W. Geoghegan
Assistant Examiner—Frank Susko
Attorney—Jennings, Carter & Thompson

[57] ABSTRACT

Means to prevent lubricant from being forced out of shaft supported bearings and the like when the bearing is subjected to differential in pressure at opposite ends. The pressure against the downstream end or face of the bearing is increased by reversely directing some of the air flowing axially of the bearing against the downstream end thereof, thus in part equalizing pressure at both ends, preventing lubricant from being drawn through the bearing.

2 Claims, 3 Drawing Figures

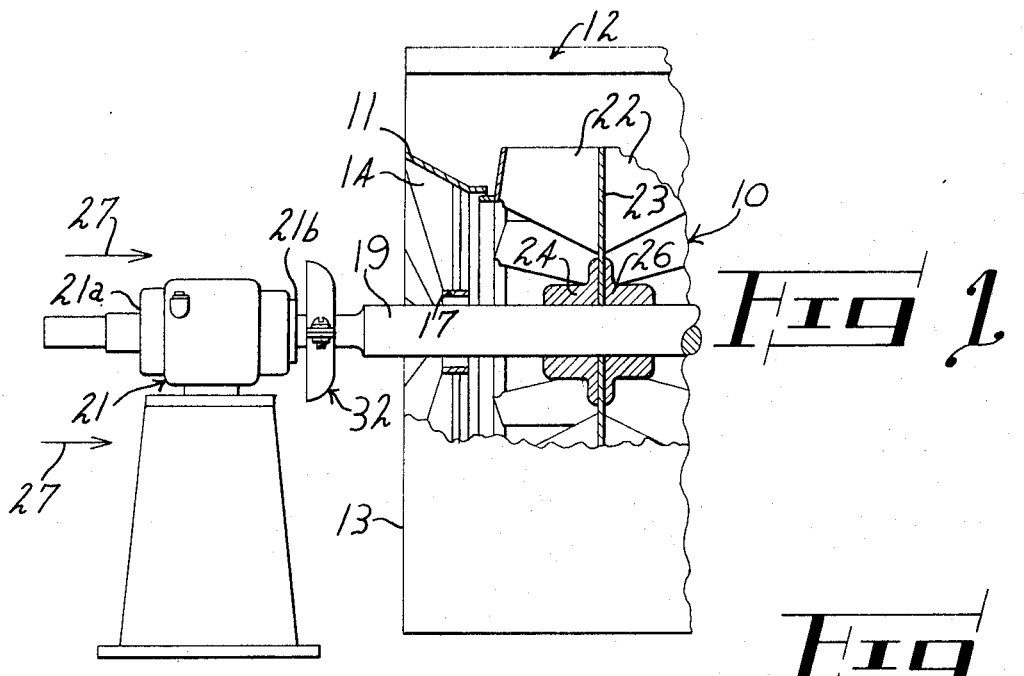
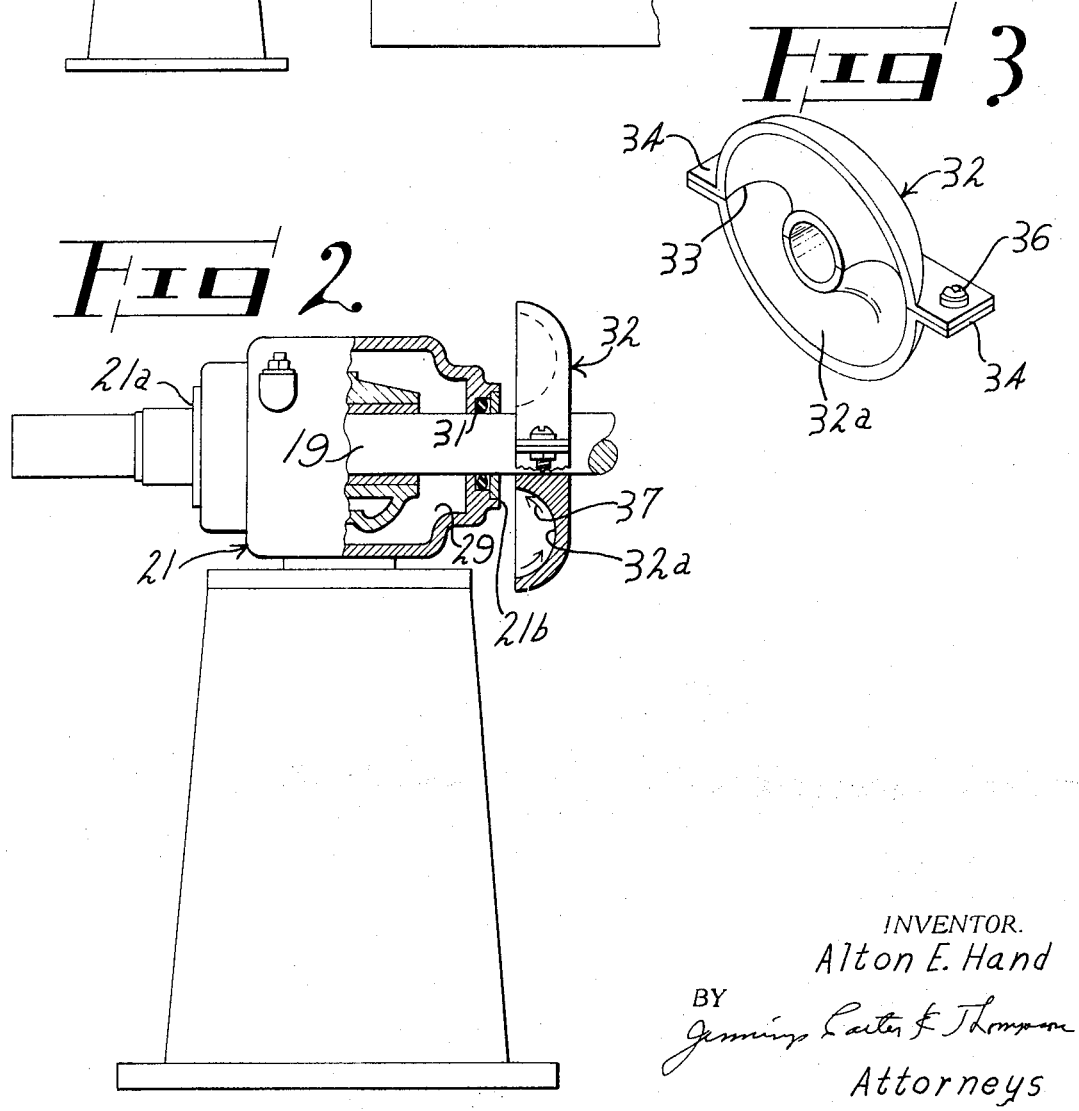

MEANS TO PREVENT LUBRICANT FROM BEING FORCED OUT OF BEARINGS AND THE LIKE

In the operation of heavy-duty axial flow fans and similar equipment having a shaft supported on antifriction or sleeve bearings, there heretofore has been a problem in keeping the same lubricated. This problem exists because of a difference in pressure between the upstream and downstream ends or faces of such bearings. Thus, the kinetic energy of the moving air striking the upstream end or face of a housed bearing, coupled with the reduction in pressure at the downstream end or face due to turbulent flow at the downstream end causes the lubricant to be sucked out of the downstream end of the bearing. The problem becomes aggravated when the lubricant seals at the downstream end become slightly worn.

In view of the above an object of my invention is to provide means associated with such bearings to raise the pressure of the air in the area of the downstream end or face so that it more nearly equals the air pressure on the upstream end or face, thus in effect maintaining little if any differential in pressure at the ends of the bearing, thereby eliminating or greatly reducing the tendancy of lubricant to exude or be pulled from the downstream end of the bearing.

More specifically, I propose to provide a disclike air shield located adjacent the downstream end of the bearing and so constructed as to reversely direct some of the air flowing over the bearing back toward the downstream end thereof, thus to effect a velocity to pressure conversion, raising the pressure adjacent the downstream end and preventing lubricant from being sucked from the bearing.

I further propose to mount the air shield thus described on the shaft supported by the bearing so that the shield rotates with the shaft.

Still further, I propose to split the disclike member so that it may be clamped about the shaft, permitting installation of the air shield without removing the shaft from the bearing.

Apparatus-illustrating features of my invention is shown in the accompanying drawing forming a part of this application in which:

FIG. 1 is a somewhat diagrammatic view showing my invention applied to one side of a double entry, heavy-duty fan, some of the parts being broken away and in section;

FIG. 2 is an enlarged side elevational view with certain parts broken away and in section and showing my improved shield mounted on the shaft of a fan; and, FIG. 3 is a detached, isometric view of my improved air shield.

Referring now to the drawings for a better understanding of my invention I show the same in association with one side of a heavy-duty fan or blower indicated generally at 10. Thus, the fan or blower includes a casing having an inlet cone 11, an outlet 12 and a scroll case or impeller housing 13. The fan may also have inlet vanes 14 on one side of the impeller case or housing 13, which are supported by the cone 11 and an inner band 17. Extending all the way across the fan is a driven shaft 19 which may be mounted at each end in bearings 21, only one of which is shown. Mounted on the shaft is an impeller having blades 22 supported from a central disc 23 and hub members 24 and 26 mounted on the shaft.

From the diagrammatic showing of FIG. 1 it will be seen that with the fan in operation air is drawn through the inlet vanes as indicated by the arrows 27, and flows axially of the shaft 19 and bearing 21. Under these conditions there exists a differential in pressure between the upstream end or face 21a and the downstream end or face 21b of the bearing. That is to say, due to the movement of air striking the upstream end 21a, and the turbulence at the downstream end 21b, the pressure at the downstream end is lower than the pressure at the upstream end. Under these conditions lubricant in the housing of the bearing is drawn from the lubricant well 29 thereof, and outwardly past the seals or lubricant retainers 31, whereupon the bearing soon is depleted of the necessary lubricant.

My invention comprises the reverse air shield indicated in the drawing generally by the numeral 32. Thus, it will be seen that the shield 32 is generally a disclike member which has a reversely contoured upstream surface indicated at 32a and that in diameter it is larger than the bearing housing. More in detail, I prefer to make the shield 32 in halves, split along the diametrical line 33, and to provide the same with flanges 34 to receive fasteners 36 so that the unit may be clamped about the shaft 19 without removing the shaft from its bearing.

It will further be noted that the contour of the upstream face of the disc member 32 is such that air striking the outer periphery of the member 32 is directed generally in the direction of the arrows 37, that is, generally reversely toward the center of the downstream end 21b of the bearing. Under these conditions the velocity of the moving air is converted to pressure, whereby the downstream end 21b is maintained under higher pressure than would be the case without my improved reverse air shield 32. With the pressure thus raised at the downstream end the tendancy for the lubricant to be sucked from that end of the bearing is eliminated, whereby the reservoir 29 remains filled with the proper amount of lubricant.

In view of the foregoing it will be seen that I have devised an improved air shield for bearings which are operated in an environment wherein air moving over the same causes lubricant to be sucked from the downstream end thereof, which shield eliminates this difficulty.

While I have shown my invention in but one form, it will be obvious to those skilled in the art that it is not so limited, but is susceptible of various other changes and modifications without departing from the spirit thereof.

What is claimed is:

1. In means to increase air pressure on the downstream end of a bearing or the like to prevent lubricant from being pulled from the bearing by low pressure existing at said downstream end, an air deflector located adjacent the downstream side of the bearing, said deflector being a disclike member, the upstream face of said member being concavely curved, whereby air striking the peripheral areas of said curved face is reversely directed generally toward the center of the downstream side of the bearing.

2. Apparatus as defined in claim 1 in which a rotating shaft passes through the bearing and in which said air deflector is mounted on the shaft for rotation therewith, said deflector being diametrically split into halves, whereby it may be placed about said shaft, and flanges on the halves thereof for receiving fasteners, thereby to clamp the halves to the shaft.

* * * * *